(12) United States Patent
Breault et al.

(10) Patent No.: US 7,049,018 B2
(45) Date of Patent: May 23, 2006

(54) METHOD OF OPERATING A FUEL CELL SYSTEM UNDER FREEZING CONDITIONS

(75) Inventors: Richard D. Breault, North Kingstown, RI (US); Patrick L. Hagans, Columbia, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 47 days.

(21) Appl. No.: 10/656,529

(22) Filed: Sep. 5, 2003

(65) Prior Publication Data

US 2005/0053807 A1 Mar. 10, 2005

(51) Int. Cl.
*H01M 8/04* (2006.01)

(52) U.S. Cl. .......................... 429/13; 429/26

(58) Field of Classification Search ................. 429/13, 429/26, 30, 33, 39
See application file for complete search history.

(56) References Cited

U.S. PATENT DOCUMENTS

| | | | | |
|---|---|---|---|---|
| 5,798,186 A | * | 8/1998 | Fletcher et al. ............... | 429/13 |
| 5,853,909 A | | 12/1998 | Reiser .......................... | 429/13 |
| 6,024,848 A | | 2/2000 | Dufner et al. ............... | 204/252 |
| 6,117,577 A | | 9/2000 | Wilson .......................... | 429/17 |
| 6,329,089 B1 | * | 12/2001 | Roberts et al. ............... | 429/13 |
| 6,632,555 B1 | * | 10/2003 | Ding .......................... | 429/30 |
| 6,777,115 B1 | * | 8/2004 | Reiser .......................... | 429/13 |
| 2002/0146610 A1 | * | 10/2002 | Hayashi et al. ............... | 429/30 |
| 2004/0033396 A1 | * | 2/2004 | Thompson et al. ........... | 429/13 |

* cited by examiner

*Primary Examiner*—Mark Ruthkosky
(74) *Attorney, Agent, or Firm*—Stephen E. Revis

(57) ABSTRACT

A fuel cell system having a stack of proton exchange membrane fuel cells is operated in sub-freezing temperatures by draining any liquid water from the fuel cell water flow passages upon or after the previous shut-down of the stack before freezing can occur, and, thereafter a) starting-up the stack by directing fuel and oxidant reactants into the cell and connecting a load to the stack; b) using heat produced by the stack to increase the operating temperature of the stack to melt ice within the stack; and, c) upon the stack operating temperature reaching at least 0° C., circulating anti-freeze through stack coolers to maintain the temperature of the stack low enough to maintain a sufficiently low water vapor pressure within the cells to prevent cell dry out for at least as long as there is insufficient liquid water to circulate through the water flow passages.

6 Claims, 3 Drawing Sheets

METHOD OF OPERATING A FUEL CELL SYSTEM UNDER FREEZING CONDITIONS

BACKGROUND OF THE INVENTION

1. Technical Field

This invention relates fuel cells, and particularly to the operation of fuel cells.

2. Background Information

It is generally agreed that one difficulty with utilizing fuel cell systems that operate out of doors, such as to power a vehicle, is starting and operating the fuel cell at temperatures below the freezing point of water. Freezing provides potential mechanical damage as a consequence of the expansion of ice, and presents problems due to the inseparability of water and the fuel cell processes. For example, fuel cells are typically cooled by circulating water therethrough, and during operation, water is required for humidification of the reactant gases. A problem particularly related to the use of fuel cells in vehicles is the need to be able to quickly start the vehicle after exposure to freezing temperatures that have caused water within the fuel cell system to freeze. Heretofore, various methods for starting "frozen" fuel cells have concentrated on providing heat for periods of time to appropriate portions of the system, either by reaction or by combustion of fuel, or by means of battery power. Other efforts are directed toward processes designed to accelerate the rate at which a fuel cell stack will heat up to above-freezing temperatures, as a consequence of its own operation. In U.S. Pat. No. 5,798,186, the fuel cell is warmed up simply by connecting a load across it while stochiometric fuel, oxidant are supplied to the stack. In U.S. Pat. No. 6,329,089, individual fuel cells at −5° C. started with room temperature hydrogen and air reached 0.5 amps per $cm^2$ in five minutes. This is unsatisfactory for vehicles, such as automobiles, which must be operating in less than one minute after initiating startup, at temperatures as low as −40° C.

With proton exchange membrane (PEM) fuel cells, such as those described in U.S. Pat. No. 6,024,848 to Dufner and incorporated herein by reference, there is the additional problem that areas of the PEM or of a water transport plate (WTP) within the cell may dry out during the period of start-up and warm-up due to the lack of water available for humidification of the reactants. Such dry out may result in the mixing of reactants or the degradation of materials.

BRIEF SUMMARY OF THE INVENTION

One object of the present invention is a method for starting and operating a stack of fuel cells in sub-freezing temperatures.

Another object of the present invention is a method for starting and operating a stack of fuel cells in sub-freezing temperatures without the need to wait for ice within the system to be melted prior to start-up.

Yet another object of the present invention is a method of starting and operating a stack of fuel cells in sub-freezing conditions when liquid water is not available within the system at start-up for humidification of the reactants.

The method of the present invention is particularly useful for starting and operating a stack of PEM fuel cells in sub-freezing conditions where the stack is a powerplant for a vehicle.

Accordingly, in a fuel cell system that includes a stack of PEM fuel cells, the stack having at least one cooler therein for carrying antifreeze through the stack, and each cell having water flow passages therethrough, the method of the present invention is to operate the system in sub-freezing ambient temperatures by a) draining any liquid water from the cell water flow passages upon or after the previous shut-down of the stack before freezing can occur, and thereafter b) starting-up the stack by directing fuel and oxidant reactants into the cell and connecting a load to the stack; c) using heat produced by the stack to increase the operating temperature of the stack to melt ice within the stack; and, d) upon the stack operating temperature reaching at least 0° C., circulating anti-freeze through stack coolers to maintain the temperature of the stack low enough to assure a sufficiently low water vapor pressure within the cells to prevent cell dry out for at least as long as there is insufficient liquid water to circulate through the water flow passages.

As used throughout this application, the phrase "stack temperature", "temperature of the stack", "stack operating temperature", "cell operating temperature", or the like, means average temperature of the stack or of the cell (as the case may be), since there is a temperature variation over the planform of the cells, such as from the reactant inlets to the reactant outlets.

Also, in this application the phrase "dry out" means at least a portion of the PEM or at least a portion of a water transport plate has insufficient water to function properly. As mentioned above, in the case of a PEM, insufficient water could result in crossover of the reactants or result in localized damage that harms performance of the cell over time. In the case of a WTP, dry out results in reactant gas passing therethrough, such as into water flow passages.

By draining liquid water from water flow passages within the cell stack after a shutdown, the stack may be quickly started up in freezing temperatures by feeding oxidant and fuel into the cells and connecting the cell to a load. However, even if only temporarily there is insufficient water to circulate through the cells to humidify the reactants and keep the cell components moist, steps must be taken to prevent the cells from drying out during that time. In this regard, the stack is operated at part power while cell temperatures are still very low and before the coolant (anti-freeze) is circulated. No steps are taken to remove heat (i.e., to cool) the stack until the heat generated by the electrochemical reaction raises the temperature of the cells to at least above freezing.

Once the stack temperature is at a selected temperature above freezing, anti-freeze circulation is initiated through the stack cooler or coolers. Water produced by the stack is collected until there is enough to circulate through the cells via the usual water circulation system. Until that time, anti-freeze is circulated to assure the stack temperature is maintained low enough to prevent dry out of the cells, but, preferably, as high as possible to achieve the best cell output characteristics. Once water is circulating through the water flow passages of the cells, low stack temperatures are no longer required and the temperature of the stack is allowed to increase to its normal design operating temperature. For a known stack design, stack temperature may be determined, for example, from the oxidant exhaust temperature, which is a known function of the stack average temperature.

It should be understood that primary cooling of the stack is, at all times, the function of an anti-freeze coolant circulation system. A typical stack will have a water circulation rate of only about 1.0% of the antifreeze coolant circulation rate; and thus water circulation provides very little cooling. On the other hand, during operation of the stack at normal design temperatures, such as between about 65° C. and 85° C. for current day PEM cells operating at about atmospheric pressure, about 25%–30% of the stack waste heat is removed in the reactant exhaust streams as a result of the bulk of the product water evaporating into the reactant streams.

Although the antifreeze may be circulated as soon as the stack temperature is high enough to begin melting any ice within the cells, it is preferred to melt all the ice and to allow the stack to rise to a higher temperature, preferably at least about 10° C., and most preferably to about 30° C.–40° C., before cooling of the stack by antifreeze circulation is begun. While any cell stack temperature above freezing and low enough to prevent dry out is acceptable, cell output characteristics are better at the higher temperatures.

At normal cell design operating temperatures of, for example, 65° C.–85° C., 90–95% of the water produced by, the cells leaves the cells in the reactant gas exhaust streams, with the remainder passing into the WTP's and water circulation channels. At cell operating temperatures of 30° C.–40° C. only about 16% of the product water is lost as vapor in the reactant exhaust. Thus, in the present invention, the use of low operating temperatures without water circulation minimizes the amount of product water lost with the reactant gas streams and more rapidly enables the water circulation system to fill with water and become operational. This allows the stack to operate sooner at the more efficient higher operating temperatures for which the cells were designed.

In this invention, with very little, if any, frozen water within the stack at the time of start-up, the stack operating temperature is able to more quickly reach a temperature exceeding 0° C. At that point the antifreeze circulation may begin, and the stack may be operated at higher levels, even at full power, without the fear of exceeding temperatures that could cause dry out, even if no water is as yet circulating through the cells. As will be described in more detail hereinafter, in one experiment a stack of cells operating at 10° C. and 800 mA/ft$^2$ was observed to produce about 75% of the power that the same stack produced at the same current density but operating at a normal operating temperature of 65° C. At an operating temperature of 40° C. this increased to about 90%. This data demonstrates that, with this invention, if desired, the stack may be operated continuously without water circulation at temperatures as low as 10° C., and will still perform reasonably well.

In one embodiment of the present invention, the water flow passages and the attendant water circulation system are drained of liquid at the beginning of an extended period or season where below freezing temperatures are expected (i.e. for the winter), and remain empty until that period or season passes. The cells of the stack are operated without water flow therethrough during this extended period. As in previously described embodiments, each shut-down during this period includes draining any accumulated water from within the cell water flow passages; and each start-up includes operating the stack to melt any ice accumulated within the cells and circulating the anti-freeze coolant to maintain a sufficiently low operating temperature to prevent dry out. That means in this embodiment the stack is operated at below normal design temperatures throughout the selected period when below freezing temperatures could occur.

In one embodiment of the present invention, the water flow passages and the water circulation system are both drained upon shutdown, but a water accumulator or reservoir within the water circulation system is not drained. Upon start-up of the stack, electricity or waste heat generated by the stack, or a separate battery is used to melt the ice. While the ice in the accumulator is being melted, the anti-freeze is circulated within the stack to maintain a low stack temperature to prevent dry out. As soon as the ice in the accumulator is melted, the water circulation system may be turned on and the temperature of the stack is allowed to increase to normal operating levels.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
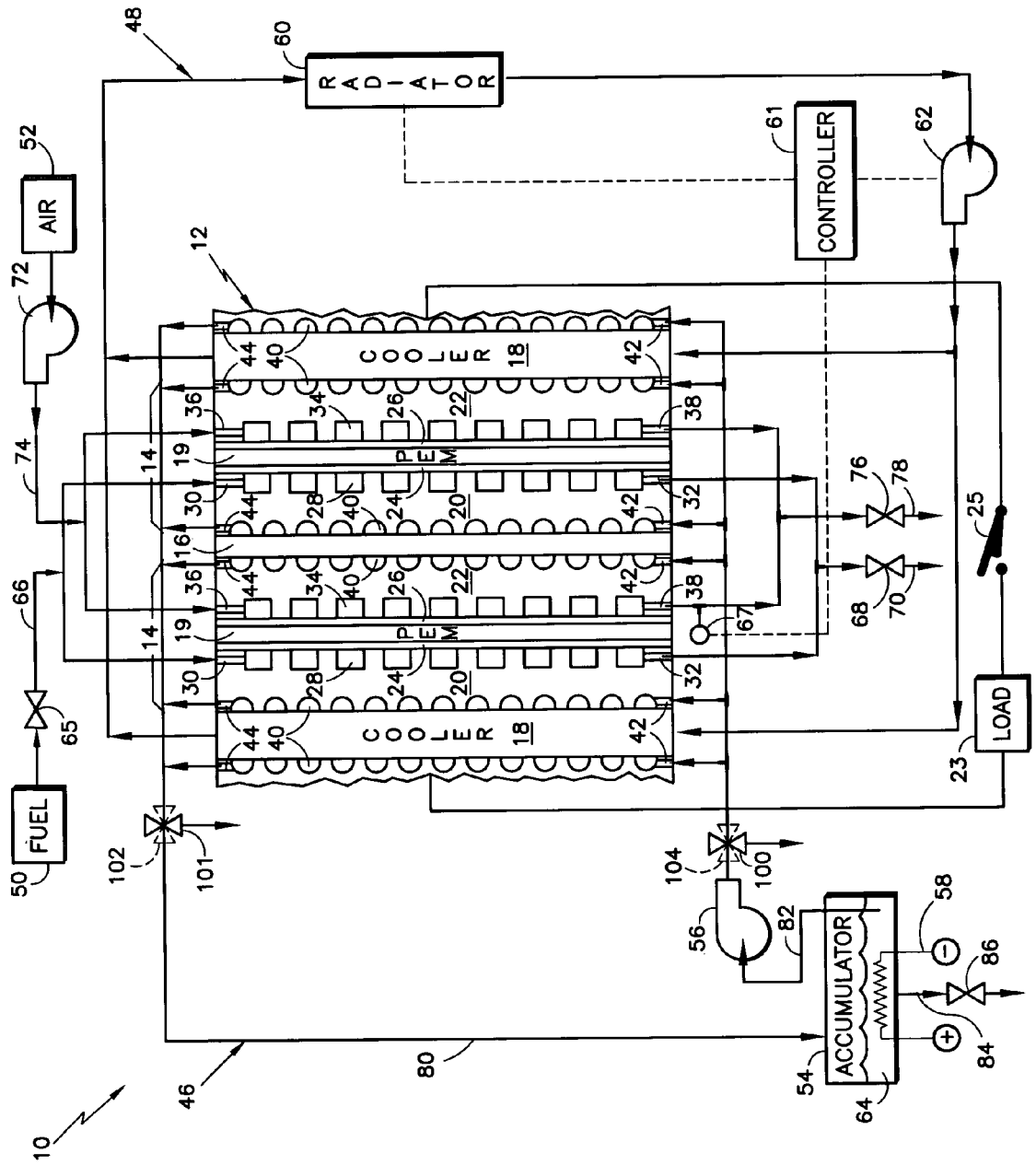
FIG. 1 is a schematic representation of a fuel cell system that is operated in accordance with the method of the present invention.

Referring to FIG. 1, a fuel cell system 10 includes a stack 12 of fuel cells 14 shown in cross-section. Adjacent cells are separated either by a non-porous separator plate 16 or by a non-porous cooler 18. In this embodiment, an electrically conductive cooler 18 is disposed between every other cell, although it is contemplated that a cooler for every three, four, or even more cells may be sufficient for some fuel cell systems. Each cell 14 includes a proton exchange membrane 19 sandwiched between a porous, hydrophilic anode water transfer plate (AWTP) 20 and a porous, hydrophilic cathode water transfer plate (CWTP) 22. The cells are connected in series through a load 23. The stack is connected and disconnected to the load 23 by a switch 25. The load may be a vehicle propulsion system.

Adjacent the anode side of the PEM is an anode catalyst layer 24 and adjacent the cathode side of the PEM is a cathode catalyst layer 26. Fuel gas channels 28, here shown as formed in the AWTP, define a fuel flow field within each cell for carrying fuel, such as hydrogen, across the cell into contact with the anode catalyst. The fuel channels 28 have inlets 30 and outlets 32. Oxidant gas channels 34, here shown as formed in the CWTP, define an oxidant flow field within each cell for carrying oxidant, such as air, across the cell into contact with the cathode catalyst. The oxidant channels 34 have inlets 36 and outlets 38. The AWTP's and CWTP's also define, with the either the surface of an adjacent cooler 18 or the surface of an adjacent separator plate 16, as the case may be, water flow passages 40 for carrying liquid water across the fuel cells over the surfaces of the AWTP's and CWTP's. The flow passages 40 in the AWTP's and CWTP's have inlets 42 and outlets 44.

The fuel cell system 10 further includes a water circulation system 46; a coolant circulation system 48; a source of fuel 50, such as hydrogen gas; and a source of oxidant 52, such as air. The water circulation system includes an accumulator 54, a water pump 56, and an optional heater 58 (for certain embodiments of the invention). The coolant circulation system includes a radiator 60, a controller 61, and a coolant pump 62.

In accordance with a first embodiment of the present invention, assume that the switch 25 is closed and the stack is producing electricity. Also, assume there is plenty of water in the accumulator 54 for circulating through the cells, and the stack is operating at an average temperature of 75° C., as determined by a temperature sensor 67 that measures the oxidant exhaust temperature, which is a known function of the stack average operating temperature. Hydrogen fuel from the source 50 is delivered through a valve 65 and conduit 66 into the fuel gas channels 28 via the fuel inlets 30 of the cells. The fuel exits the cells through the fuel outlets 32 and is exhausted through a valve 68 via a conduit 70.

A pump 72 in a conduit 74 blows air from the source 52 into the cell air inlets 36 and through the oxidant channels 34. The spent air leaves the oxidant channels of the cells via the air outlets 38 and is exhausted to atmosphere through a valve 76 via a conduit 78.

The pump 56 of the water circulation system 46 pumps water 64 from the accumulator into the water flow passages 40 via the water inlets 42. Water leaves the passages 40 via the outlets 44 and is returned to the accumulator 54 via a conduit 80. At a stack temperature of 75° C., most of the product water from operation of the cells evaporates into the reactant gas channels and leaves the cells entrained in the exhaust streams; however, a small amount may move into the water flow channels through the porous water transport plates 20, 22, and from there into the accumulator. Excess water in the water circulation system may be drained from the accumulator via a conduit 84 and valve 86. Although not shown, there may be a bypass conduit connecting the conduit 80, at a point upstream of the accumulator, directly to the conduit 82 downstream of the accumulator. Sensors and other controls would determine whether any water from the accumulator needed to be added to the circulating water and open appropriately located valves as necessary.

Controlled cooling of the stack is accomplished by circulating antifreeze through the coolers 18 and radiator 60 in the coolant circulation system 48. The controller 61 receives a temperature signal from the sensor 67 and regulates the amount of heat rejected within the radiator to maintain the 75° C. stack temperature.

Assuming ambient temperatures are, or are expected to be, at or below freezing, and the shut down duration is long enough for water within the stack to freeze, the stack is shut down as follows: The switch 25 is opened to disconnect the stack from the load and the reactant flows to the stack are halted, as is circulation of the antifreeze and water. The valve 86, vent valve 101, as well as a valve 100 in a conduit communicating with the conduit 82 and located physically below the water flow passages 40, are opened to drain all the water from the passages 40, the accumulator 54, and all other conduits and components of the water circulation system 46. Due to the small pore size of the WTP's, they will not drain. Before restarting operation of the stack, these valves are closed. To start up the fuel cell system, the valves 86, 100 and 101 are closed; delivery of the reactant gases to the cells is begun; and the switch 25 is closed, connecting the stack electrically across the load.

As electricity is produced, the temperature of the stack begins to increase and water is also produced. As the stack heats up any ice within the cells, such as within the pores of the WTP's, melts; and eventually water produced by the cells is drawn into the WTP's and moves into the passages 40. The water flows, such as by gravity and/or due to reactant gas over pressure, from the passages 40 into the accumulator 54. The controller is programmed to begin circulation of the antifreeze when the stack temperature reaches a pre-selected temperature above freezing. The controller governs the operation of the radiator 60 to maintain the temperature of the stack at that pre-selected temperature until the water circulation system is operational. A variable speed coolant pump and/or a coolant bypass loop (not shown) around the radiator may also be used to maintain the stack at the appropriate temperature. When enough water is accumulated to operate the water circulation system 46, the pump 56 is turned on. The controller 61 then allows the temperature of the stack to increase to the stack's normal operating temperature.

Figure 2:
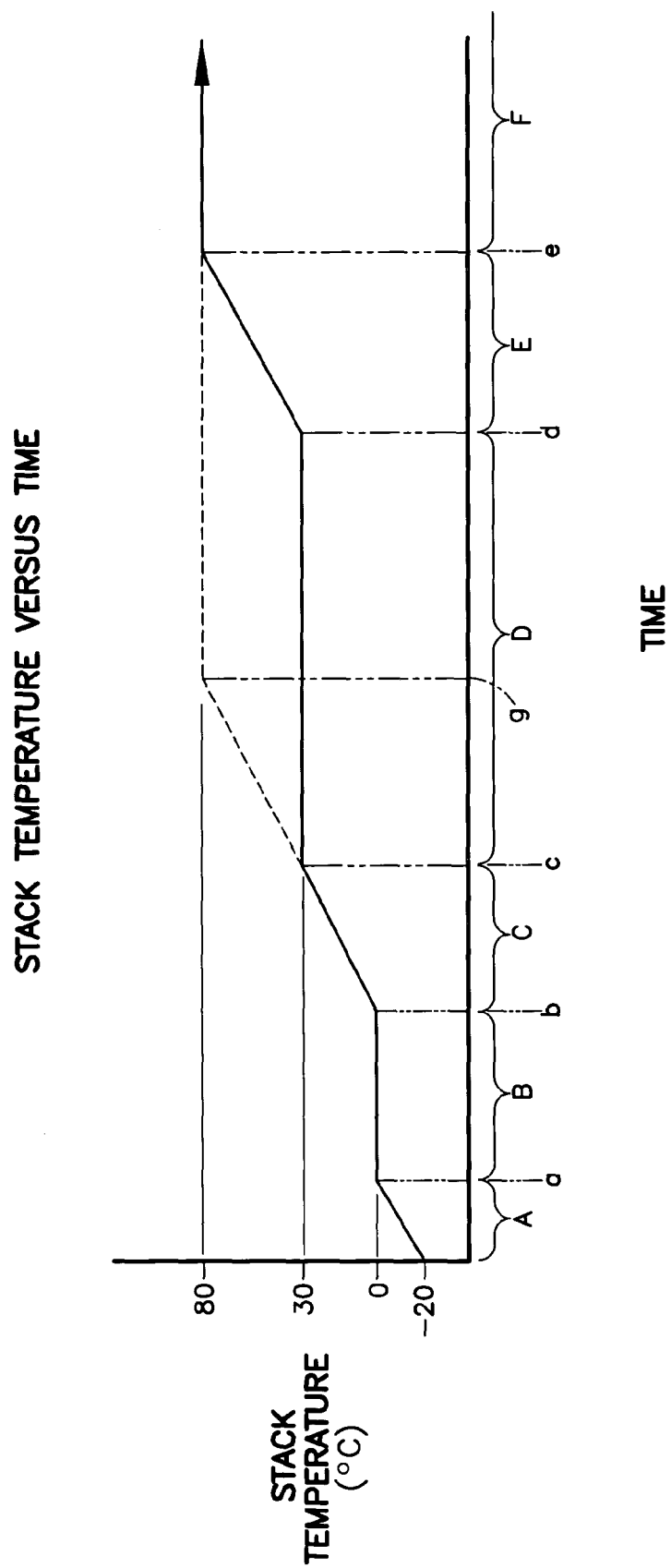
FIG. 2 is a graph of stack temperature versus time as the fuel cell system is operated according to one embodiment of the present invention.

A start-up sequence in accordance with this first embodiment of the present invention is illustrated by the graph of FIG. 2, wherein stack temperature is plotted on the vertical axis and time is plotted on the horizontal axis. In the example of FIG. 2, the low temperature at which the stack will be held until there is sufficient water to circulate has been pre-selected to be 30° C. At the initiation of start-up the ambient temperature and the physical temperature of the stack components is assumed to be −20° C. The reactant flows are initiated and the load is connected across the cells at time zero. Electricity begins to flow and heat and water are produced. During period A, the sensible heat of the stack rises from −20° C. to 0° C., at which point any ice within the stack begins to melt. Melting begins at time 'a' and continues during period B until complete at time 'b'. The cell operating temperature now begins to rise above freezing. During period C, from time 'b' to time 'c', the stack temperature increases to 30° C. At this point the antifreeze circulation is begun and the temperature is maintained at 30° C. during the period D, from time 'c' to 'd'. At time 'd' enough liquid water has accumulated within the accumulator to allow it to operate, and the water circulation system 46 is turned on. During period E from 'd' to 'e' the controller 60 allows the stack temperature to increase to a normal operating temperature, which here happens to be 80° C. The controller then maintains the temperature within the stack's normal operating temperature range.

Still referring to FIG. 2, without the benefit of the present invention the solid lines from time 'c' to 'e' would be replaced by the dotted lines. In that case, the temperature of the stack is allowed to increase without operating the cooler until the stack reaches its normal operating temperature at time 'g'. Cooling is generally begun at time 'g', but by that time dry out is likely to have already occurred, causing damage.

Figure 3:
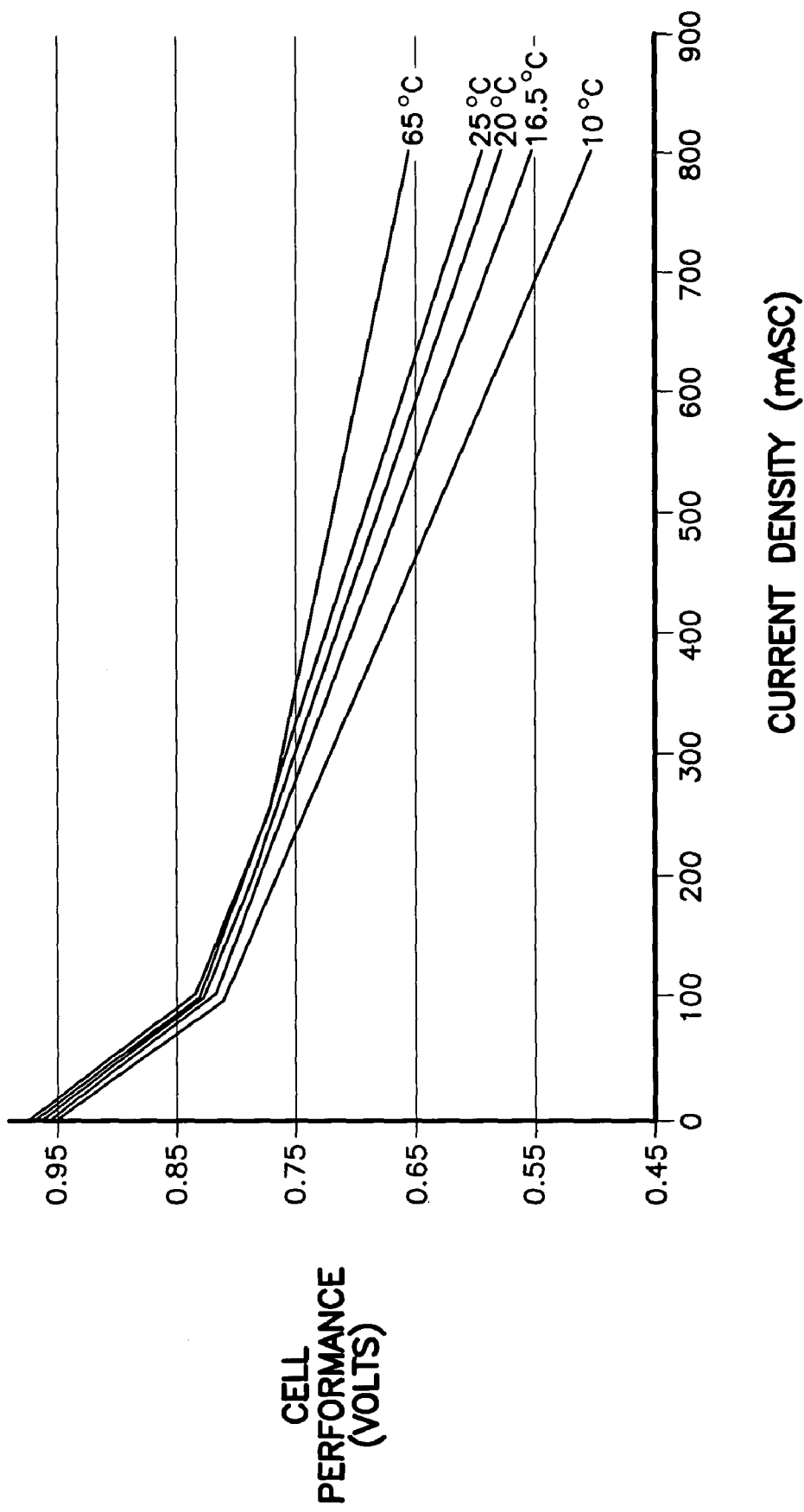
FIG. 3 is a graph showing the effect of stack temperature on fuel cell performance.

In the preceding example of the first embodiment of the present invention, the controller 61 turns on the pump 62 to begin circulation of the antifreeze once the stack temperature reaches a preselected temperature of 30° C. However, as previously mentioned, circulation of the antifreeze may begin as early as time 'b' when all the ice within the stack has melted, and even before it has completely melted (i.e. during period B). The temperature at which the antifreeze circulation begins and the temperature at which the stack is maintained during the time no water is circulating is a matter of design choice, considering the need to prevent dry out as well as the performance characteristics of the stack. With regard to the latter, consider the plotted data set forth in FIG. 3. That graph of cell performance versus current density at various stack operating temperatures shows that reasonable performance is obtained even as low as 10° C., where, at 800 ma/cm$^2$ the cell performance is still about 75% of the performance at 65° C. For some situations, operation at a temperature as low as 0° C. for a short period of time may even be acceptable, however, at such a low temperature the stack can only produce a small percent of its rated power. Since better performance and more power can be obtained at higher temperatures, it is preferred to start circulation of the anti-freeze after allowing the stack temperature to rise to 30° C.–40° C., since temperatures within that range have a vapor pressure low enough to prevent dry out under most reactant utilizations and provide quite good performance. (At 14.7 psia, at a temperature of 30° C. the vapor pressure of water is about ½ the vapor pressure at 45° C. and ⅙$^{th}$ the vapor pressure at 70° C.) In addition to needing a low vapor pressure, there is the need to be able to reject the waste heat from the stack to ambient via the radiator 60. Typically, one wants to have at least about a 20° C. temperature differential between the ambient air and the coolant exiting the radiator. The exit temperature of the coolant from the radiator is approximately the same as the temperature of the coolant entering the stack cooler. If, for example, the average stack temperature is to be maintained at 40° C. and the coolant leaving the radiator and entering the cooler needs to be 30° C., the ambient air temperature would have to be 10° C. or less to remove the waste heat. If the average stack temperature were to be maintained lower than 40° C. the coolant temperature entering the cooler would need to be lower than 30° C., and the ambient air temperature would need to be even lower.

In a second embodiment of the present invention, instead of draining the entire water circulation system, 46 upon shut-down under freezing or potentially freezing conditions, only the water flow passages and the water carrying conduits leading to and from the accumulator are drained, such as, but not necessarily, into the accumulator. The water in the accumulator is allowed to remain. The procedure for starting the fuel cell system after a shutdown is the same as described in the foregoing embodiment, except the water needed for circulation is already within the water circulation system 46. If that water is not frozen, or if enough of it is not frozen at the time of start-up, the water may be circulated within the system starting simultaneously with delivering fuel and air to the stack. The antifreeze coolant may also be circulated immediately, but, since dry out is not a problem, circulation of the coolant is preferably delayed until the stack reaches its normal operating temperature. On the other hand, if the water within the accumulator is initially all frozen, or if enough is not liquid, a separate heater 58, operated by a storage battery or by the electricity generated by the stack is used to melt the frozen water. Alternatively, heat generated by the stack may be used. This melting of frozen water may be done simultaneously with collecting stack product water, as before, until there is sufficient water to circulate. While the frozen water is being melted and collected, the coolant circulation system 48 is operated in the manner of the previous embodiment to keep the stack operating at temperatures that prevent dry out, but that are high enough to provide good performance. When the water begins to circulate the controller then allows the stack temperature to increase to normal operating levels.

The second embodiment provides advantages when the temperatures do not happen to fall to below freezing after a shutdown, since there will be liquid water immediately available for circulation at start-up. The downside is the additional equipment and controls needed to enable melting of the water in the accumulator in the event of freezing.

In yet a third embodiment, the intent is to isolate and drain the water circulation system, consisting of the accumulator and water pump, on a seasonal basis. For that purpose, isolation valves 102, 104 are provide in the conduits 80, 82, respectively. These valves are shown in phantom in FIG. 1. Upon shut-down of the fuel cell system immediately prior to a period of time, such as winter, when it is believed that freezing may occur, that portion of the water circulation system 46 to the left of the valves 102, 104 is drained. The valves 102, 104 remain closed during this "cold" period. Thereafter, until it is decided that the period of possible freezing is over, the fuel cell system is operated without water circulation, from start-up through shut-down. Antifreeze coolant flow is started using the same criteria as discussed in connection with the first embodiment; however, in this embodiment, with no water circulation, the temperature of the stack is maintained low from start up through shut down. With reference to FIG. 2, in an example of this embodiment, during the cold period operation through periods A, B, and C would be the same, but the coolant circulation would maintain the stack temperature at 30° C. throughout a period D lasting until shut-down. No water would be collected for circulation.

During stack operation during the cold period, water will accumulate in the water channels and any excess water is vented overboard via valve 101, which may remain open. Valve 100 may remain closed during such operation. After each shut down in the cold period the accumulated water is drained from the water flow passages, such as by opening the valve 100. When the cold period is over and the chance of water freezing is gone, the isolation valves 102, 104 are opened, the accumulator is filled, and the fuel cell system is operated as it normally would be with water always available for circulation.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A method for operating a fuel cell system, the system including a stack of PEM fuel cells including at least one cooler for carrying antifreeze through the stack to remove heat, the fuel cell system further including a water circulation system for accumulating water and circulating that water through water flow passages passing through each cell, wherein, at the time of start-up, the stack has frozen water therein and there is insufficient liquid water within the water circulation system to enable the circulation of water, the method for operating the fuel cell system including (a) starting up and operating the frozen stack by introducing non-humidified reactants into the cells and connecting a load across the stack to generate heat to increase the stack temperature to above 0° C. and thereby melt frozen water within the stack, including accumulating liquid water during stack operation until there is sufficient liquid water to enable circulation of liquid water through the cell water flow passages, and thereafter circulating that water through the water flow passages to provide humidification for the cells, and, (b) at a stack operating temperature above 0° C., initiating and maintaining the circulation of antifreeze through the stack cooler to prevent the operating temperature of the stack from increasing beyond a preselected temperature during the period of operation of the stack prior to said step of circulating the water, said preselected temperature being selected to prevent the cells from drying out during said period of operation, and (c) allowing the stack operating temperature to increase above that preselected temperature after water circulation through the water flow passages has begun, and (d) shutting down the stack and, upon shutdown, draining liquid water from the cell water flow passages before it freezes.

2. The method according to claim 1, wherein the stack operating temperature is allowed to increase to said preselected temperature before antifreeze circulation is initiated, and the antifreeze circulation maintains the stack operating temperature at said preselected temperature until water circulation through the water flow passages has begun.

3. The method according to claim 1, wherein the preselected temperature is no more than about 40° C.

4. The method according to claim 1, wherein the preselected temperature is between 30° C. and 40° C.

5. The method according to claim 2, wherein said preselected temperature is between 30° C. and 40° C.

6. The method according to claim 1, wherein the water circulation system includes a water accumulator, wherein upon start-up of the stack the accumulator has frozen water therein, and operation of the stack after startup is used to melt frozen water within the accumulator.

* * * * *